United States Patent Office 3,362,999
Patented Jan. 9, 1968

1

3,362,999
FLUORO CYCLOHEXENYL OR CYCLOPENTEN-YL HYDROXYALKYLENE SULFIDES
Melvin M. Schlechter, New Hyde Park, N.Y., and Richard F. Sweeney, Randolph Township, N.J., assignors to Allied Chemical Corporation, New York, N.Y., a corporation of New York
No Drawing. Filed Apr. 5, 1965, Ser. No. 445,723
10 Claims. (Cl. 260—609)

ABSTRACT OF THE DISCLOSURE

Unsaturated, alicyclic, halogen-containing hydroxy thioethers having the formula $$\begin{array}{c} C_nX_{2n} \\ X_2C \diagup \quad \diagdown C-A \\ X_2C \quad \quad \parallel \\ \diagdown \quad \diagup C-B \\ CX_2 \end{array}$$

wherein X is fluorine or chlorine, wherein $n$ is 0 or 1, and wherein A and B are fluorine, chlorine, or —S—R—OH wherein R is an alkylene radical, with the proviso that at least one of A and B must be —S—R—OH, and that at least one fluorine atom must be present in the molecule, are prepared by base-catalyzed reaction of perhaloalkenes having the formula $$\begin{array}{c} C_nX_{2n} \\ X_2C \diagup \quad \diagdown C-X \\ X_2C \quad \quad \parallel \\ \diagdown \quad \diagup C-X \\ CX_2 \end{array}$$

wherein X and $n$ have the aforestated meanings, with mercapto-alkanols (SH—R—OH) in the presence of an inert polar organic solvent. The thioethers are useful as insecticides and as solvents and sealants for chlorotrifluoroethylene polymers and nylon-6.

---

This invention relates to the production of a novel class of unsaturated, alicyclic, halogen-containing, hydroxy thioethers.

An object of this invention is to provide a novel class of chemical compounds and more particularly to provide a class of halogenated cyclopentenyl- and cyclohexenyl-hydroxythioethers, hereinafter referred to as thioethers, which thioethers are characterized by the presence of a hydroxyalkylthio group on one or both of the unsaturated carbon atoms of the cycloalkenyl group, the remaining unsaturated carbon of the cycloalkenyl group, if any, and all of the saturated cyclic carbon atoms therein, being perhalogenated with either fluorine or chlorine atoms, there being present at least one fluorine atom in the molecule.

Another object of the invention is to provide a process for the production of such thioethers.

Other objects and advantages of the invention will become apparent from a consideration of the following description and discussion of the subject invention.

The novel thioethers of the invention may be represented by the following formula:

$$\begin{array}{c} C_nX_{2n} \\ X_2C \diagup \quad \diagdown C-A \\ X_2C \quad \quad \parallel \\ \diagdown \quad \diagup C-B \\ CX_2 \end{array}$$

2 wherein X may be F or Cl, $n$ may be 0 or 1 and A and B may each be a member selected from the group consisting of X and S—R—OH, wherein X is as defined above and wherein R is an alkylene radical, preferably containing from 2–8 carbon atoms, with the proviso that at least one of the members A and B must be the member S—R—OH, there being present at least one fluorine atom in the molecule.

It has been found that thioethers, as above-described, which contain at least one chlorine atom in the molecule, have utility as solvents, for polymers, terpolymers and copolymers of trifluorochloroethylene and as sealing adjuvants for films of such polymers.

In addition, the thioethers of the invention and particularly those with a high percentage of fluorine in the molecule, have been found to be useful as solvents and sealants for Capran (nylon-6).

The novel thioethers also exhibit insecticidal activity, particularly miticidal.

The thioethers may be prepared by reacting a perhalocycloalkene of the formula:

$$\begin{array}{c} C_nX_{2n} \\ X_2C \diagup \quad \diagdown C-X \\ X_2C \quad \quad \parallel \\ \diagdown \quad \diagup C-X \\ CX_2 \end{array}$$

wherein X may be F or Cl and $n$ may be 0 or 1, there being at least one fluorine atom present in the molecule, with a mercaptoalkanol of the formula:

$$HS—R—OH$$

wherein R is an alkylene radical, straight or branched chain, preferably containing from 2–8 carbon atoms, and an inorganic base, in the presence of an inert polar solvent, preferably an alkanol.

In organic bases utilizable must be soluble in the solvent to be employed and are exemplified by the following: alkali metal hydroxides, alkali metal carbonates, alkaline earth metal hydroxides and alkaline earth metal carbonates.

Inert polar sovents are well known in the art, ethyl alcohol, dioxane, diglyme and dimethylformamide being illustrative.

The preferred alkanol solvent may be straight or branched chain and may contain any feasible number of carbon atoms. Illustrative members of this group include methanol, ethanol, isopropanol, n-butanol and neo-pentanol.

The reaction may be illustrated by the following equation:

$$\underset{\substack{F_2 \\ F_2}}{\overset{F_2}{\bigcirc}} \begin{matrix} -Cl \\ -Cl \end{matrix} + HS-R-OH + NaOH \xrightarrow{C_2H_5OH}$$

$$\underset{\substack{F_2 \\ F_2}}{\overset{F_2}{\bigcirc}} \begin{matrix} -Cl \\ -S-R-OH \end{matrix}$$

wherein R is as defined supra.

In an excess of HS—R—OH and NaOH reactants, the corresponding bis compounds, viz., compounds of the formula:

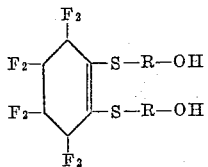

will be formed, wherein R is as defined above.

When the corresponding halogenated cyclopentenyl mono- or bis-thioethers are desired, the corresponding perhalocyclopentenes are employed and the reaction proceeds substantially in the same way.

There is no criticality in the number of carbon atoms which may be contained in the alkylene radical of the HS—R—OH reactant. The only limitations are the practical ones of stability and solubility of the resulting mercaptoalkanol molecule in the reaction medium to be employed.

Mercaptoalkanols (HO—R—SH) may be prepared, as is known in the art, by the reaction of the coresponding alkylene oxide with $H_2S$. The reaction may be catalyzed by the presence of water, lower alkanols and various other materials, such as porous clay and alumina and is preferably carried out at elevated temperatures. The compounds mercaptomethanol and 1-mercaptoethanol have not been isolated and apparently are unstable.

The perhalocycloalkene starting materials may be prepared by known procedures which are reported in the literature. For example, perchlorocyclopentene may be fluorinated with $SbF_3$ to a mixture of 1,2-dichloroperhalocyclopentene(s)-1 in which the halogen atoms consist of varying proportions of fluorine to chlorine and which fluorine may be in a variety of positions. This procedure is reported by Henne et al., JACS, vol. 67, No. 8 (Aug. 9, 1945), pp. 1235–36. The corresponding 1,2-dichloroperhalocyclohexene(s)-1 may be prepared by an analogous procedure and also by fluorinating hexachlorobenzene with $SbF_5$ at temperatures below about 160° C., as reported by Leffler, J. Org. Chem., vol. 24 (1959), pp. 1132–33. 1,2-difluoroperhalocyclohexene(s)-1 may be prepared by fluorinating hexachlorobenzene with a 50% excess of $ClF_3$, as reported by Chambers et al., Tetrahedron, vol. 19 (1963), pp. 891–92 (Pergamon Press Ltd., Northern Ireland). In an analogous manner, the corresponding 1,2-difluoroperhalocyclopentenes may be prepared.

The reaction of the invention may be carried out in conventional vessels constructed of ordinary materials, such as Pyrex or steel, which vessels are preferably equipped with stirring means, condensing means and means for adding the mercaptoalkanol reactant slowly, such as a dropping funnel.

The process affords the advantages of operation at atmospheric pressures and at low temperatures. Superatmospheric or subatmospheric pressures may be employed, however, with no particular benefit.

The reaction may be carried out over a relatively wide range of temperatures, the upper limit being the boiling point of the solvent employed. Temperatures below about 30° C. are generally preferred for good results. Better results are obtained when the reaction is carried out at temperatures between about 0–20° C. and optimum results are obtained when temperatures are maintained between about 0–10° C. Temperatures below about 0° C. are operable, however, decreased yields are obtained due to the increase in viscosity of the reactant solutions.

The reaction is mildly exothermic and accordingly it is necessary to positively control the reaction temperatures to within the desired limits. This may be accomplished by regulation of mixing of the reactants to control exotherm, by removal of heat of reaction, by any conventional cooling means, or by any combination of the above.

For maximum yields of the monothioether products, the perhalocycloalkene, mercaptoalkanol and inorganic base reactants are employed in their stoichiometric amounts, i.e., equimolar portions. As little as 0.1 mole of inorganic base per mole of perhalocycloalkene may be used and the reaction will proceed, except that diminished yields of the corresponding thioether product will be obtained. Similarly, if the concentration of the mercaptoalkanol reactant with respect to the perhalocycloalkene is reduced, the reaction will proceed but proportionately less of the desired thioether product will be obtained. An excess of either of the mercaptoalkanol reactant or the inorganic base reactant will not deleteriously affect the reaction.

For maximum yields of the bisthioether products, the mercaptoalkanol reactant and inorganic base reactant are each employed in a 2:1 stoichiometric ratio based on the perhalocycloalkene reactant. When more than one and less than two moles of either of the mercaptoalkanol or inorganic base reactants are employed, bisthioether products will be formed, although in proportionately diminished yields.

The amount of solvent required is that amount needed to keep the reactants in solution. Generally, 1–50 parts by volume of solvent per combined parts of the other reactants will serve this purpose. Preferably, about 5–10 parts by volume of solvent per combined parts of the other reactants are employed.

The preferred mode for preparing the thioethers comprises adding the mercaptoalkanol reactant to a solution of the inorganic base reactant in the solvent, which resulting solution is then slowly added to a solution containing the perhalocycloalkene reactant in the solvent. The perhalocycloalkene, mercaptoalkanol and inorganic base reactants may be mixed simultaneously, however, or the mercaptoalkanol reactant added to the perhalocycloalkene reactant, followed by addition of the inorganic base and the solvent may be incorporated in any convenient manner.

The products, particularly the monothioethers, are normally liquids and may be recovered, as is conventional in the art, such as by extraction and drying, followed by ordinary distillation. If solid products are formed, as is the case with many of the bisthioether products, such may also be purified and recovered by conventional procedures, such as by filtration or distillation to remove organic liquids followed by recrystallization from a suitable solvent, such as a benzene-petroleum ether mixture.

The products and process of the invention are further illustrated by the following examples in which parts and percentages are by weight, unless otherwise indicated.

EXAMPLE 1

A 500 ml. three-necked flask, equipped with a water-cooled condenser, dropping funnel and stirrer was charged with 250 ml. of ethanol and 16.0 g. (0.400 mole) of sodium hydroxide. The resulting mixture was heated until solution was complete, at which time the solution was allowed to cool to room temperature. To the mixture at room temperature were added 31.1 g. (0.398 mole) of 2-mercaptoethanol. Upon addition of this material, the solution turned orange in color and the resulting orange solution was added slowly, with stirring, to a chilled solution of 108 g. (0.366 mole) of 1,2-dichlorooctafluorocyclohexene-1 in 100 ml. of ethanol. Temperature of the reaction mixture was maintained between about 0–25° C. throughout the addition. After completion of the addition, the reaction vessel contents were stirred overnight at room temperature. The precipitated sodium chloride was removed by suction filtration and the filtrate quenched with one (1) liter of ice-water. The orange organic layer separated and was washed with small portions of water. The orange organic portion was then taken up in methylene chloride and dried over sodium sulfate. Following solvent removal, the residual oil was distilled and 31.5 g., corresponding to a yield of about 23.5% of a material identified as 1-(2-hydroxyethylthio)-2-chlorooctafluorocyclohexene-1 (B.P. 102–108° C./4 mm.), were recovered.

*Analysis.*—Calculated for $C_8F_8H_4ClSO$: C, 28.6%; H, 1.19%; S, 9.51%; Cl, 10.5%; F, 45.2%. Found: C, 28.4%; H, 1.40%; S, 9.22%; Cl, 10.6%; F, 42.3%.

Infrared spectrographic analysis showed the following absorption bonds in microns: 2.90 (—OH); 3.35, 3.45 (—$CH_2$) and 6.30 (C═C), which results are consistent with the expected structure.

EXAMPLE 2

A 1,000 ml. three-necked flask, equipped with a water-cooled condenser, dropping funnel and stirrer was charged with 500 ml. of absolute alcohol and 80 g. (2.0 moles) of sodium hydroxide. The resulting mixture was heated until solution was complete, at which time the solution was allowed to cool to room temperature. To the mixture at room temperature were added 152 g. (2.00 moles) of 2-mercaptoethanol. Upon addition of this material, the solution turned dark tan in color and the resulting dark tan solution was warmed for about 1 hour at about 70° C. At the end of this period, the dark tan solution was added slowly, with stirring, over a period of about 3 hours, to a chilled solution of 490 g. (2.00 moles) of 1,2-dichlorohexafluorocyclopentene-1 in 200 ml. of absolute ethanol. Temperature of the reaction mixture during the addition was maintained between about 0–15° C., by quenching the reaction vessel in ice-water. After completion of the addition, the reaction vessel contents were stirred overnight at room temperature. The precipitated sodium chloride was removed by suction filtration and the filtrate quenched with ice-water. The organic layer separated and was washed with small portions of water, taken up in methylene chloride, and dried over sodium sulfate. Following solvent removal, the residual oil was distilled and 303 g., corresponding to a yield of about 52% of a material identified as 1-(2-hydroxyethylthio)-2-chlorohexafluorocyclopentene-1 (B.P. 87–90° C./3 mm.), were recovered.

*Analysis.*—Calculated for $C_7H_5ClF_6SO$: C, 29.32%; H, 1.74%; F, 39.79%; Cl, 12.38%; S, 11.17%. Found: C, 29.60%; H, 1.89%; F, 38.80%; Cl, 12.50%; S, 11.45%.

Infrared spectrographic analysis showed the following absorption bonds in microns: 2.90 (—OH); 3.40, 3.46 (—$CH_2$) and 6.31 (C═C), which results are consistent with the expected structure.

EXAMPLE 3

The process of Example 2 is repeated. Following the removal of the 1-(2-hydroxyethylthio)-2-chlorohexafluorocyclopentene-1 by distillation as described in Example 2, 66 g. of a solid residue remained in the reaction vessel which was recrystallized several times from a benzene-petroleum ether mixture to yield a material identified as 1,2 - bis(2 - hydroxyethylthio)hexafluorocyclopentene - 1 (M.P. 62–63° C.), corresponding to a yield of about 10%.

*Analysis.*—Calculated for $C_9H_{10}F_6S_2O_2$: C, 32.91%; H, 3.05%; F, 34.8%; S, 19.5%. Found: C, 33.46%; H, 3.15%; F, 35.0%; S, 19.5 %.

Infrared spectrographic analysis showed the following absorption bonds in microns: 2.90 (—OH); 3.35, 3.45 (—$CH_2$) and 6.48 (C═C), which results are consistent with the expected structure.

EXAMPLES 4–9

The processes of Examples 1–3 are repeated with the reactants listed in the indicated columns of Table I. The corresponding mono- and bis-thioether products obtained are listed oppositely in the last column. In Examples 4–7 KOH is used as the inorganic base and isopropanol is used as the solvent. In Examples 8–9 $Na_2CO_3$ is used as the inorganic base and dimethylformamide is used as the solvent.

*Table I*

| Ex. | Halogenated Cycloalkene Reactant | Mercaptoalkanol Reactant | Thioether Product | |
|---|---|---|---|---|
| | | | (a) Monothioether Product | (b) Bisthioether Product |
| 4 | 1,2-dichlorooctafluorocyclohexene | 2-mercaptoethanol | | 1,2-bis(2-hydroxyethylthio)-octafluorocyclohexene-1. |
| 5 | 1,2,3,3-tetrachlorohexafluorocyclohexene-1. | 2-mercaptopropanol | 1-(2-hydroxypropylthio)-2,3,3-trichlorohexafluorocyclohexene-1. | 1,2-bis(2-hydroxypropylthio)-3,3-dichlorohexafluorocyclohexene-1. |
| 6 | 3,3,6,6-tetrachlorohexafluorocyclohexene-1. | 6-mercaptohexanol | 1-(6-hydroxyhexylthio)-3,3,6,6-tetrachloropentafluorocyclohexene-1. | 1,2-bis(6-hydroxyhexylthio)-3,3,6,6-tetrachlorotetrafluorocyclohexene-1. |
| 7 | 1,2,3,3,4,4,6,6-octachlorodifluorocyclohexene-1. | 8-mercaptooctanol | 1-(8-hydroxyoctylthio)-2,3,3,4,4,6,6-heptachlorodifluorocyclohexene-1. | 1,2-bis(8-hydroxyoctylthio)-3,3,4,4,6,6-hexachlorodifluorocyclohexene-1. |
| 8 | 4,5-dichlorohexafluorocyclopentene-1. | Mercaptoneopentanol | 1-(hydroxyneopentylthio)-4,5-dichloropentafluorocyclopentene-1. | 1,2-bis(hydroxyneopentylthio)-4,5-dichlorotetrafluorocyclopentene-1. |
| 9 | 1,2,3,3-tetrachlorotetrafluorocyclopentene-1. | 4-mercaptobutanol | 1-(4-hydroxybutylthio)-2,3,3-trichlorotetrafluorocyclopentene-1. | 1,2-bis(4-hydroxybutylthio)-3,3-dichlorotetrafluorocyclopentene-1. |

When the inorganic bases and solvents employed in Examples 1–9 are interchanged or substituted by other inorganic bases and solvents as defined hereinbefore, substantially the same results are obtained.

EXAMPLE 10

1 - (2 - hydroxyethylthio) - 2 - chlorooctafluorocyclohexene - 1 and 1 - (2 - hydroxyethylthio) - 2 - chlorohexafluorocyclopentene-1 were tested as sealing adjuvants for strips of thermoplastic films composed of a copolymer of about 96% trifluorochloroethylene and about 4% vinylidene fluoride. Saturated solutions of this polymer in the thioether products were prepared by separately refluxing the thioether products with said polymer, cooling the mixtures to room temperature and decanting the solutions from the undissolved polymer. A pair of polymer film strips was sealed together without the use of sealing adjuvant. Two more pairs of polymer film strips were sealed together, this time employing as sealing adjuvants each of the above-described polymer solutions in the thioethers. The thioether sealing adjuvant solutions were applied by merely coating, as by brushing, the inner surfaces of the film strips to be sealed. An impulse heat sealer was used. The impulse heat sealer was a Sentinel Impulse Sealer. Sealing pressure was 30 p.s.i. The heat sealing temperature was 375° F. The dwell time for the seal, or in other words, the length of time during which the pressure and heat were applied to effect the seal, was three (3) seconds. The seal strength was tested by measuring the amount of force needed to rupture or pull apart the seal. The 1 - (2 - hydroxyethylthio) - 2 - chlorooctafluorocyclohexene-1 sealing adjuvant however apparently had an affect on the strength of the polymer film in the vicinity of the seal, for in that case the polymer film ruptured before the seal, at a point away from the sealing area. As can be seen from the following table, the polymer film strip pairs sealed with the adjuvant solutions ruptured (either at the seal or at the film) at weights considerably higher than the polymer film strip pair which was sealed without such a treatment.

Table II

| | Wgt. to effect rupture (grams) |
|---|---|
| Film strips heat-sealed without the use of adjuvant | <11 |
| Film strips heat-sealed with a polymer solution in 1-(2-hydroxyethylthio)-2-chlorooctafluorocyclohexene-1 | >2,260 |
| Film strips heat-sealed with a polymer solution in 1-(2-hydroxyethylthio)-2-chlorohexafluorocyclopentene-1 | >323 |

Although a copolymer of about 96% trifluorochloroethylene and about 4% vinylidene fluoride was employed, a wide variety of polymers, terpolymers and copolymers of trifluorochloroethylene may be employed with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

When other thioether products within the scope of the invention, such as those listed in the last column of Table I, are used as sealing adjuvants for films of polytrifluorochloroethylene, substantially the same results are obtained; that is to say, films of polytrifluorochloroethylene which are heat sealed employing such adjuvants, rupture at temperatures considerably higher than films of polytrifluorochloroethylene which are heat sealed without using sealing adjuvants. Thioether products which are solids under normal conditions may be employed as sealing adjuvants in substantially the same way as described above by merely working the materials at temperatures above the melting points of the solids.

EXAMPLE 11

1 - (2 - hydroxyethylthio) - 2 - chlorohexafluorocyclopentene-1 and 1,2-bis(2-hydroxyethylthio)-hexafluorocyclopentene-1 were tested as solvents and adhesives for Capran (nylon-6) film. Solutions of 10% by weight of Capran film in each of the above thioether products were prepared by dissolving the Capran film in each of the thioether products with heating. The resulting solution were cooled to room temperature and became extremely viscous. Capran strips measuring ¼″ x ½″ x 1″ were used for test purposes. The adhesive compositions were applied to a ½″ square area of the test strips which were then held in contact by a clamp and heated to 150° C. for 16 hours in a vacuum oven at 25 inches of mercury. Table III lists the weight necessary to shear apart the joined strips.

Table III

| | Weight (grams) |
|---|---|
| Capran strips sealed with Capran solution in 1-(2-hydroxyethylthio) - 2 - chlorooctafluorocyclohexene-1 | 4,110 |
| Capran strips sealed with Capran solution in 1-(2-hydroxyethylthio) - 2 - chlorohexafluorocyclopentene-1 | 4,200 |

Solid highly fluorinated thioether products may be as Capran solvents and adhesives, as above-described, by using the same at temperatures above their melting points, as in the case of those solid materials used as solvents and sealants for films of polytrifluorochloroethylene.

Since various changes and modifications may be made without departing from the spirit of the invention, the invention is to be limited only by the scope of the appended claims.

We claim:

1. Compounds of the formula:

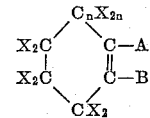

wherein X is F or Cl, $n$ is 0 or 1 and A and B are members selected from the group consisting of X and S—R—OH, wherein X is as defined above and wherein R is an alkylene radical, with the proviso that at least one of the members A and B must be the member S—R—OH, there being present at least one fluorine atom in the molecule.

2. Compounds according to claim 1 in which $n$ is 0.
3. Compounds according to claim 1 in which $n$ is 1.
4. Compounds according to claim 1 in which R is an alkylene radical containing 2–8 carbon atoms.
5. Compounds according to claim 4 in which $n$ is 0.
6. Compounds according to claim 4 in which $n$ is 1.
7. 1 - (2 - hydroxyethylthio) - 2 - chlorooctafluorocyclohexene-1.
8. 1,2 - bis(2 - hydroxyethylthio)octafluorocyclohexene-1.
9. 1 - (2 - hydroxyethylthio) - 2 - chlorohexafluorocyclopentene-1.
10. 1,2 - bis(2 - hydroxyethylthio)hexafluorocyclopentene-1.

References Cited

Reid: Organic Chemistry of Bivalent Sulfur, vol. II, pp. 24–25 (1960) QD412, S1R4C·2.

JOSEPH P. BRUST, *Primary Examiner.*

D. PHILLIPS, *Assistant Examiner.*